US012760664B1

(12) United States Patent
Lefebvre et al.

(10) Patent No.: US 12,760,664 B1
(45) Date of Patent: Oct. 13, 2026

(54) MODULAR EXHAUST CASE FOR REVERSE FLOW GAS TURBINE ENGINE

(71) Applicant: PRATT & WHITNEY CANADA CORP., Longueuil (CA)

(72) Inventors: Guy Lefebvre, Longueuil (CA); François Doyon, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/334,085

(22) Filed: Sep. 19, 2025

(51) Int. Cl.

| | |
|---|---|
| ***F01D 25/30*** | (2006.01) |
| ***F01D 25/24*** | (2006.01) |
| ***F02K 1/40*** | (2006.01) |
| ***F02K 1/52*** | (2006.01) |
| ***F02K 1/82*** | (2006.01) |

(52) U.S. Cl.
CPC ............. *F01D 25/30* (2013.01); *F01D 25/24* (2013.01); *F01D 25/243* (2013.01); *F02K 1/40* (2013.01); *F02K 1/52* (2013.01); *F02K 1/82* (2013.01); *F05D 2240/14* (2013.01)

(58) Field of Classification Search
None
See application file for complete search history.

(56) References Cited

U.S. PATENT DOCUMENTS

| | | | | |
|---|---|---|---|---|
| 2,698,872 | A | 1/1955 | Broffitt | |
| 4,040,249 | A | 8/1977 | Kahle et al. | |
| 4,177,638 | A | 12/1979 | Wood | |
| 4,208,777 | A * | 6/1980 | Walsh | F01D 25/243 29/418 |
| 4,765,751 | A | 8/1988 | Pannone et al. | |
| 6,290,173 | B1 | 9/2001 | Nickels | |
| 9,157,334 | B2 | 10/2015 | Grede et al. | |
| 10,119,449 | B2 | 11/2018 | Boekeloo et al. | |
| 10,514,003 | B2 | 12/2019 | Akcayoz et al. | |
| 10,697,076 | B2 | 6/2020 | Millward et al. | |
| 11,319,897 | B2 | 5/2022 | Young et al. | |
| 11,719,165 | B2 | 8/2023 | Le Pape et al. | |
| 11,840,346 | B2 | 12/2023 | Ozóg | |

(Continued)

FOREIGN PATENT DOCUMENTS

| | | | |
|---|---|---|---|
| CA | 3084782 | A1 | 3/2021 |
| CA | 3160067 | A1 | 11/2022 |

(Continued)

*Primary Examiner* — Lorne E Meade
*Assistant Examiner* — Alyson Joan Harrington
(74) *Attorney, Agent, or Firm* — NORTON ROSE FULBRIGHT CANADA LLP

(57) ABSTRACT

An exhaust system for an aircraft engine, has: a turbine exhaust duct (TED) having an inner wall and an outer wall defining an inlet conduit and outlet conduits; and an exhaust case enclosing the TED and defining exit ports and extending from a forward end to a rearward end and having: a first section extending between the ends, the first section extending from a first edge to a second edge and having a first flange and a second flange at the first and second edges; and a second section extending between the ends and from a third edge to a fourth edge and having a third flange and a fourth flange at the third and fourth edges, wherein the first section is detachably secured to the second section via the first flange being detachably secured to the third flange and the second flange being detachably secured to the fourth flange.

18 Claims, 13 Drawing Sheets

(56) References Cited

U.S. PATENT DOCUMENTS

| | | | | |
|---|---|---|---|---|
| 11,905,844 | B2 | 2/2024 | Kim et al. | |
| 12,246,844 | B1 | 3/2025 | Weaver et al. | |
| 2003/0072648 | A1 * | 4/2003 | Han | F04D 29/664 415/119 |
| 2009/0126366 | A1 | 5/2009 | Farber | |
| 2014/0047813 | A1 | 2/2014 | Frailich et al. | |
| 2014/0060004 | A1 * | 3/2014 | Mast | B64D 33/04 60/228 |
| 2014/0186167 | A1 | 7/2014 | Liles et al. | |
| 2015/0143816 | A1 | 5/2015 | Salunkhe et al. | |
| 2017/0067369 | A1 | 3/2017 | Hashimoto | |
| 2019/0031362 | A1 | 1/2019 | Petty, Sr. et al. | |
| 2021/0215121 | A1 | 7/2021 | Joo et al. | |
| 2022/0205369 | A1 | 6/2022 | Kim et al. | |
| 2022/0260001 | A1 | 8/2022 | Lefebvre et al. | |
| 2023/0138749 | A1 | 5/2023 | Durocher et al. | |
| 2023/0406525 | A1 * | 12/2023 | Joo | F01D 25/30 |
| 2024/0150030 | A1 | 5/2024 | Legras et al. | |

FOREIGN PATENT DOCUMENTS

| | | | | |
|---|---|---|---|---|
| CA | 3180641 | A1 | 4/2023 | |
| CA | 2915658 | C | 10/2023 | |
| EP | 3299592 | B1 | 3/2020 | |
| EP | 4174287 | A1 | 5/2023 | |
| EP | 4047191 | B1 | 9/2024 | |
| EP | 4563792 | A1 | 6/2025 | |
| KR | 20210086234 | A | 7/2021 | |
| KR | 20210103853 | A * | 8/2021 | F02K 1/06 |
| KR | 102697340 | B1 | 8/2024 | |
| KR | 20220093987 | B1 | 9/2025 | |

* cited by examiner

MODULAR EXHAUST CASE FOR REVERSE FLOW GAS TURBINE ENGINE

TECHNICAL FIELD

The application relates generally to aircraft engines and, more particularly, to exhaust cases of such engines.

BACKGROUND

Exhaust ducts are disposed downstream of turbine sections and are configured for evacuating combustion gases that have been used to power the turbine sections. These combustion gases are hot and care should be taken to ensure that the exhaust ducts sustain these harsh conditions. Existing exhaust ducts are satisfactory, but improvements are always sought.

SUMMARY

In one aspect, there is provided an exhaust system for an aircraft engine, comprising: a turbine exhaust duct (ted) having an inner wall and an outer wall conjointly defining an annular inlet conduit for directing combustion gases in an axial direction and extending around a central axis and outlet conduits fluidly communicating with the inlet conduit and extending generally radially outwardly relative to the inlet conduit; and an exhaust case enclosing the ted and extending around the central axis, the exhaust case defining exit ports fluidly communicating with the outlet conduits of the ted, the exhaust case extending from a forward end to a rearward end and having: a first section extending between the forward end and the rearward end, the first section extending around the central axis from a first edge to a second edge, the first section having a first flange at the first edge and a second flange at the second edge; and a second section extending between the forward end and the rearward end, the second section extending around the central axis from a third edge to a fourth edge, the second section having a third flange at the third edge and a fourth flange at the fourth edge, wherein the first section is detachably secured to the second section via the first flange being detachably secured to the third flange and the second flange being detachably secured to the fourth flange.

The exhaust system for an aircraft engine described above may include any of the following features, in any combinations.

In some embodiments, the first flange is securable to the third flange and the second flange is securable to the fourth flange via bolts and nuts.

In some embodiments, each of the first section and the second section defines a respective one of the exit ports.

In some embodiments, the first flange contacts the third flange, and the second flange contacts the fourth flange, at a plane containing the central axis.

In some embodiments, the exhaust system for an aircraft engine includes a locating pin mounted to the first flange and a locating aperture defined by the third flange, the locating pin slidably received in the locating aperture upon the first flange contacting the third flange.

In some embodiments, the exhaust system for an aircraft engine includes a fixture secured to the inner wall of the ted, the fixture securable to a structural component of the aircraft engine, the ted being cantilevered off the fixture, the fixture being flexible in a radial direction relative to the central axis.

In some embodiments, the outer wall of the ted is devoid of connection to the exhaust case.

In some embodiments, the exhaust system for an aircraft engine includes gaps extending annularly fully around outlet ends of the outlet conduits.

In some embodiments, the first section and the second section are symmetrical.

In some embodiments, a thickness of the first section and the second section is about 0.25 inch.

In another aspect, there is provided a reverse-flow gas turbine engine of an aircraft, comprising: an outer case assembly extending around a central axis and enclosing a core, the core including a compressor section, and a turbine section, the turbine section located forward of the compressor section relative to a direction of travel of the aircraft, the outer case assembly including an exhaust case defining exit ports; and a turbine exhaust duct (ted) having an inner wall and an outer wall conjointly defining an annular inlet conduit for directing combustion gases in an axial direction and extending around the central axis and outlet conduits fluidly communicating with the inlet conduit and extending generally radially outwardly relative to the inlet conduit, the outlet conduits communicating with the exit ports, wherein the exhaust case includes first and second sections extending axially relative to the central axis, the first and second sections conjointly extending fully around the central axis and detachably jointed together via mating flanges secured to opposed edges.

The reverse-flow gas turbine engine of an aircraft described above may include any of the following features, in any combinations.

In some embodiments, the mating flanges include a first flange of the first section securable to a third flange of the second section and a second flange of the first section securable to a fourth flange of the second section via bolts.

In some embodiments, the first flange contacts the third flange, and the second flange contacts the fourth flange, at a plane containing the central axis.

In some embodiments, the reverse-flow gas turbine engine of an aircraft includes a locating pin mounted to the first flange and a locating aperture defined by the third flange, the locating pin slidably received in the locating aperture upon the first flange contacting the third flange.

In some embodiments, each of the first section and the second section defines a respective one of the exit ports.

In some embodiments, the reverse-flow gas turbine engine of an aircraft includes a fixture secured to the inner wall of the ted, the fixture securable to a structural component of the gas turbine engine, the ted being cantilevered off the fixture, the fixture being flexible in a radial direction relative to the central axis.

In some embodiments, the outer wall of the ted is devoid of connection to the exhaust case.

In some embodiments, the reverse-flow gas turbine engine of an aircraft includes gaps extending annularly fully around outlet ends of the outlet conduits.

In some embodiments, the first section and the second section are symmetrical.

In some embodiments, a thickness of the first section and the second section is about 0.25 inch.

BRIEF DESCRIPTION OF THE DRAWINGS

Reference is now made to the accompanying figures in which.

DETAILED DESCRIPTION

Figure 1:
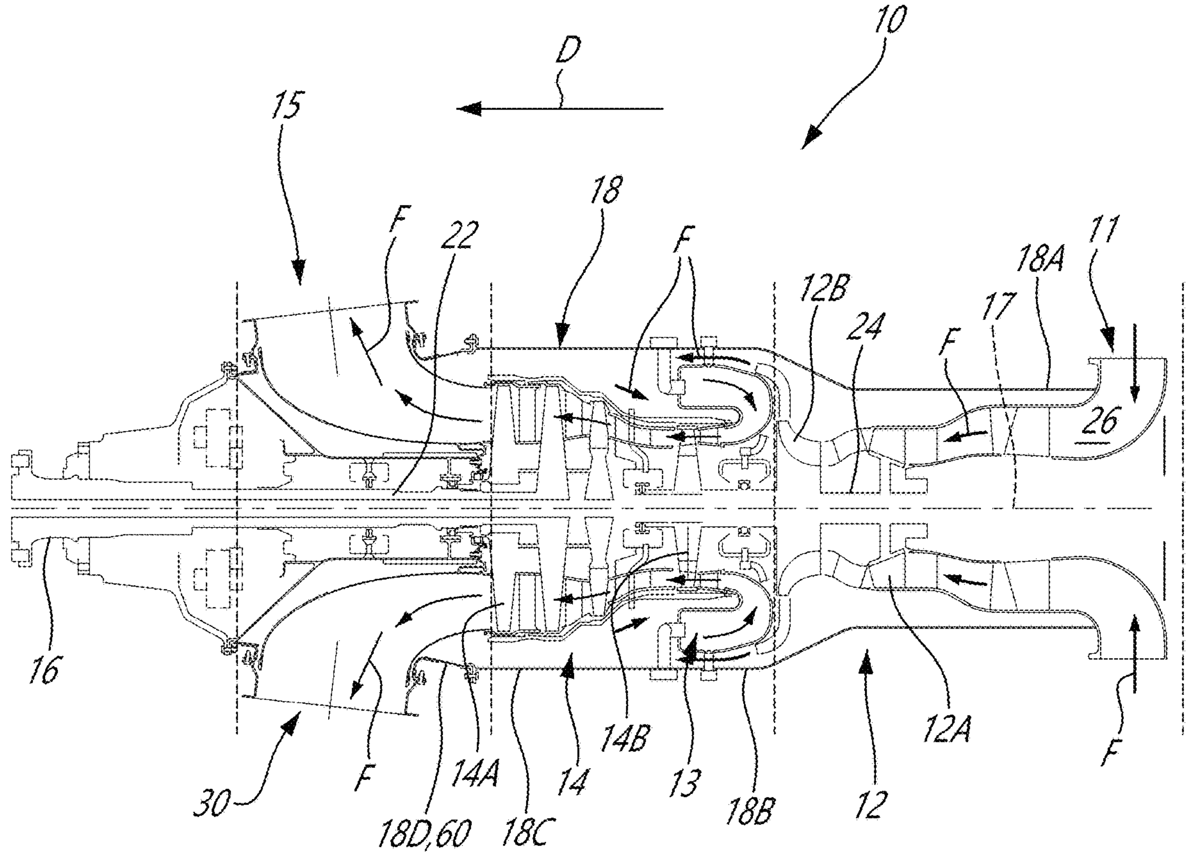
FIG. 1 is a schematic cross-sectional view of an aircraft engine depicted as a turboprop gas turbine engine.

FIG. 1 illustrates an aircraft engine depicted as a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust system 15 through which the combustion gases exit the gas turbine engine 10. The gas turbine engine 10 has a central axis 17. The gas turbine engine 10 in FIG. 1 is a turboprop engine and includes an output shaft 16, which may drive a propulsor, such as a rotor or propeller, for providing thrust for flight and taxiing. It is understood that the gas turbine engine 10 can adopt various other configurations. For instance, the gas turbine engine 10 could be configured as a turboshaft engine having an output shaft connectable to a rotatable load, such as a helicopter rotor or the like.

The gas turbine engine 10 has an outer case assembly 18 housing a core through which gases flow and which includes most of the turbomachinery of the gas turbine engine 10. The illustrated gas turbine engine 10 is a "reverse-flow" engine 10 because gases flow through the core from the air inlet 11 at a rear or aft portion of the gas turbine engine 10, to the exhaust system 15 at a front portion of the gas turbine engine 10. This is in contrast to "through-flow" gas turbine engines in which gases flow through the core of the gas turbine engine from a front portion to a rear portion. The direction of the flow of gases through the gas turbine engine 10 is shown in FIG. 1 with arrows F.

It will thus be appreciated that the expressions "forward" and "aft" used herein may refer to the relative disposition of components of the gas turbine engine 10, in correspondence to the "forward" and "aft" directions of the gas turbine engine 10 and aircraft including the gas turbine engine 10 as defined with respect to the direction of travel D. In the embodiment shown, a component of the gas turbine engine 10 that is "forward" of another component is arranged within the gas turbine engine 10 such that it is located closer to the output shaft 16. Similarly, a component of the gas turbine engine 10 that is "aft" of another component is arranged within the gas turbine engine 10 such that it is further away from the output shaft 16.

Still referring to FIG. 1, the core of the gas turbine engine 10 may include one or more spools. The illustrated embodiment is a two-spool engine including a low pressure (LP) spool and a high pressure (HP) rotatable about the central axis 17 to perform compression to pressurize the air received through the air inlet 11, and to extract energy from the combustion gases before they exit the core via the exhaust system 15 at a forward end of the core. The core may include other components as well, including, but not limited to internal combustion engines (e.g. rotary engines such as Wankel engines for compounding power with a turbine of the turbine section), gearboxes, tower shafts, and bleed air outlets.

Each spool generally includes at least one component to compress the air that is part of the compressor section 12, and at least one component to extract energy from the combustion gases that is part of the turbine section 14. More particularly, according to the illustrated embodiment, the LP spool has an LP turbine 14A which extracts energy from the combustion gases, and an LP compressor 12A for pressurizing the air. The LP turbine 14A and the LP compressor 12A can each include one or more stages of rotors and stators, depending upon the desired engine thermodynamic cycle, for example. The LP spool further comprises an LP shaft 22 drivingly connecting the LP turbine 14A to the LP compressor 12A. Gears (not shown) can be provided to allow the LP compressor 12A to rotate at a different speed than the LP turbine 14A. The LP turbine 14A may also drivingly connected to the output shaft 16 via a RGB.

Still referring to FIG. 1, the HP spool comprises an HP turbine 14B drivingly engaged (e.g. directly connected) to a HP compressor 12B by a high pressure shaft 24. Similarly to the LP turbine 14A and the LP compressor 12A, the HP turbine 14B and the HP compressor 12B can each include one or more stages of rotors and stators. The LP compressor 12A, the HP compressor 12B, the combustor 13, the HP turbine 14B and the LP turbine 14A are in serial flow communication via a gas path 26 being annular and extending through the core about the central axis 17. The gas path 26 leads to the exhaust system 15 downstream of the turbine section 14.

The outer case assembly 18 includes a plurality of cases disposed along the central axis 17 of the gas turbine engine 10. These cases are secured to one another at mating flanges using suitable fastening means, such as nuts and bolts. Any fastening means are contemplated. The outer case assembly 18 includes a compressor case 18A enclosing the compressor section 12, a combustor case 18B enclosing the combustor 13, a turbine case 18C enclosing the turbine section 14, and an exhaust case 18D being part of the exhaust system 15.

Figure 2:
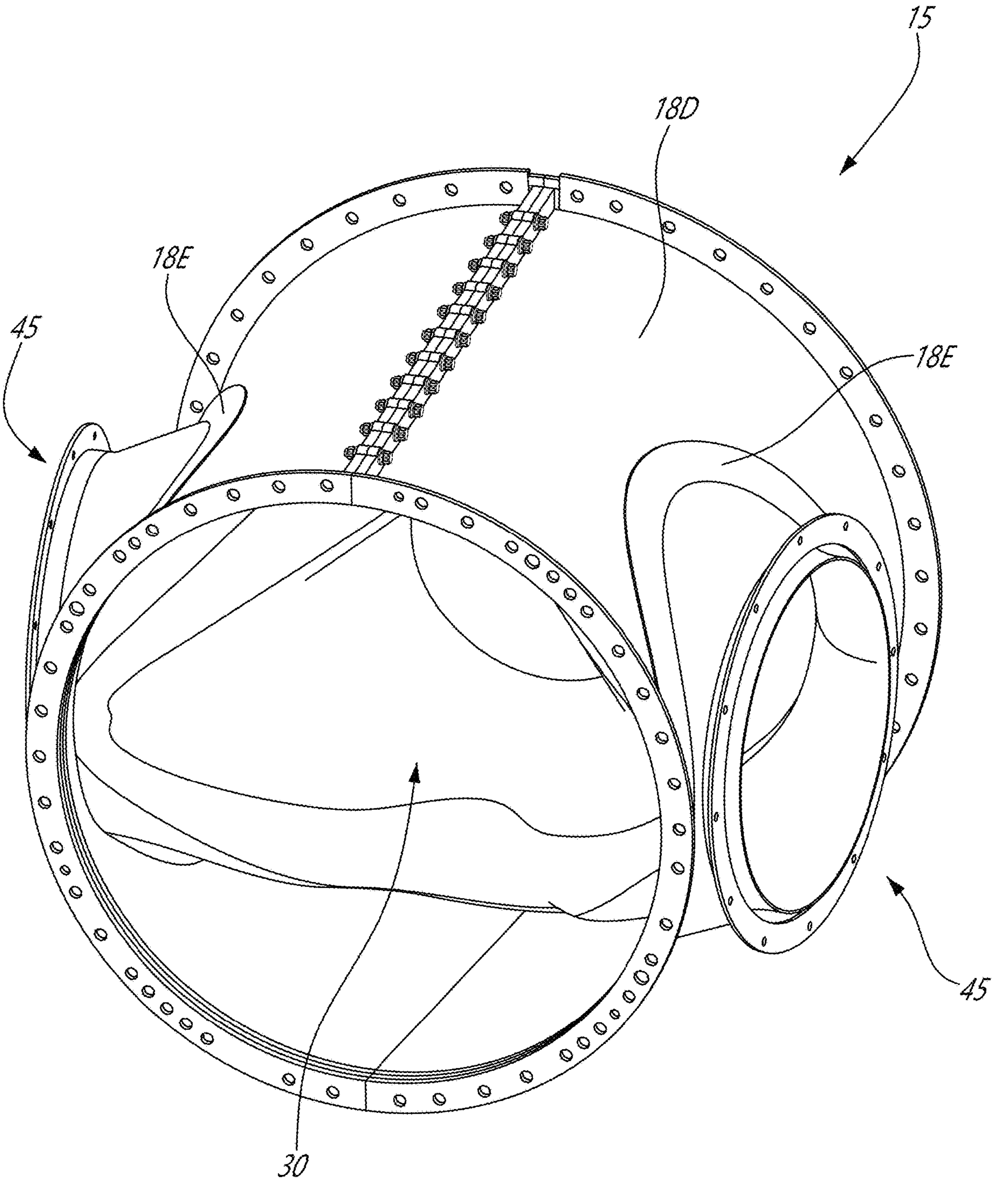
FIG. 2 is a three-dimensional view of an exhaust system of the aircraft engine of FIG. 1.
Figure 3:
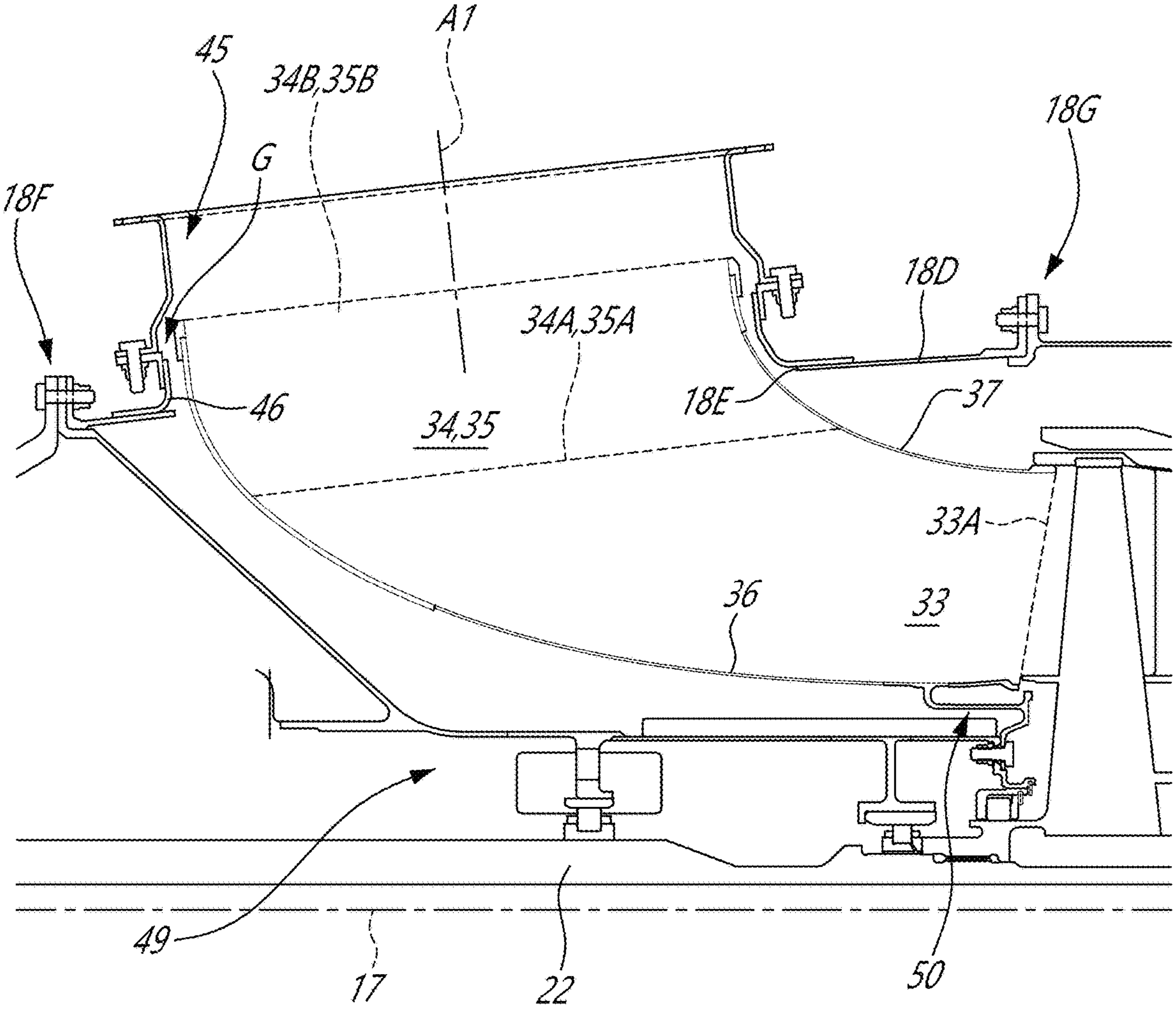
FIG. 3 is a cross-sectional view of the exhaust system of FIG. 2.

Referring to FIGS. 1-3, the exhaust system 15 of the gas turbine engine 10 comprises a turbine exhaust duct (TED) 30 secured to the exhaust case 18D. The exhaust case 18D extends circumferentially around the central axis 17 and defines openings 18E, two openings in this embodiment and that are also referred herein as exit ports, sized for receiving portions of the turbine exhaust duct 30 that will be described below. The two openings 18E may be diametrically opposed to one another. More or less than two openings may be used in some embodiments.

Figure 4:
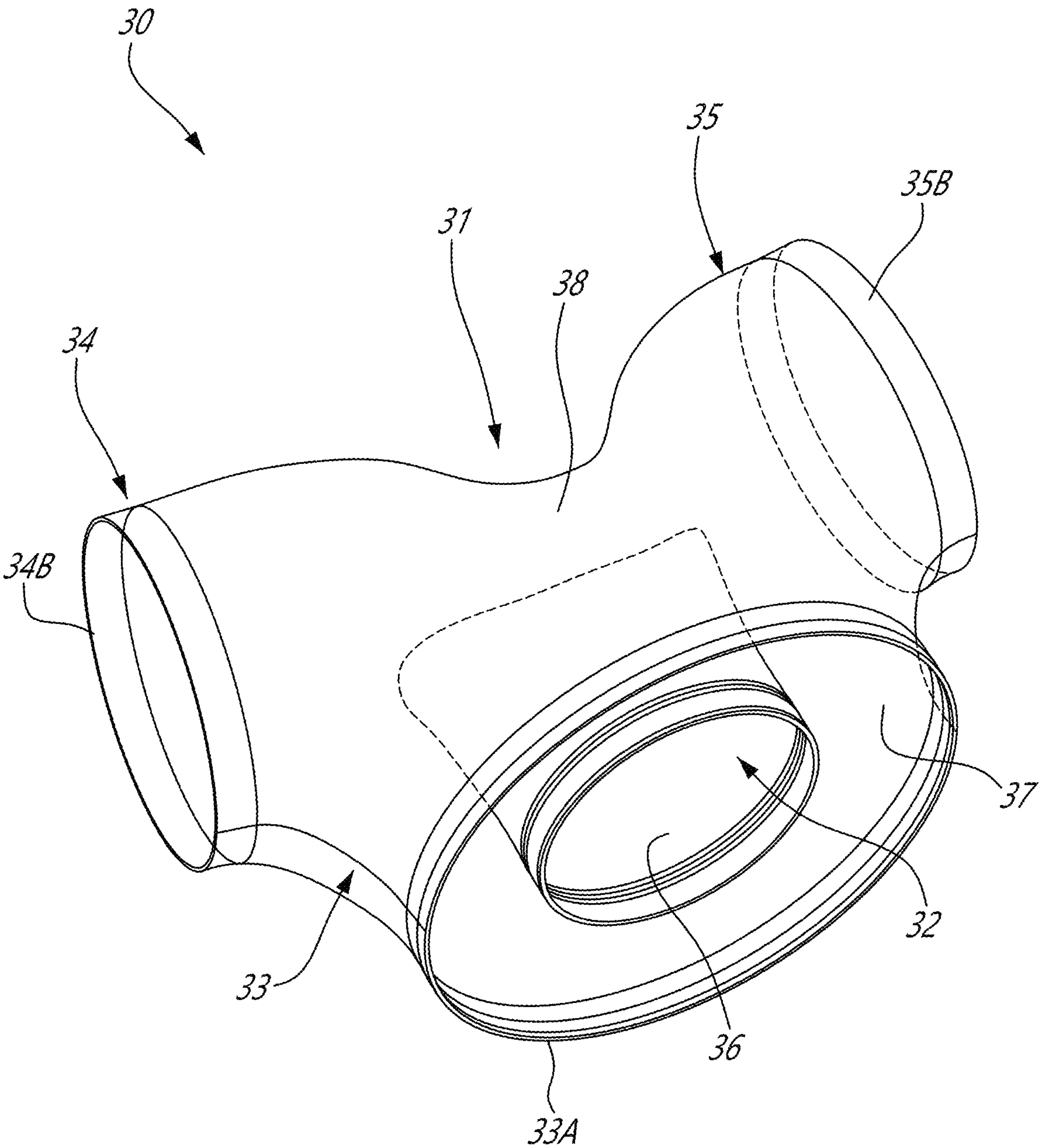
FIG. 4 is a three-dimensional view of a turbine exhaust duct of the exhaust system of FIG. 3.

Referring now to FIG. 4, the turbine exhaust duct 30 is described in more detail. The turbine exhaust duct 30 is used for exhausting combustion gases received from the last stage of the LP turbine 14A. According to the illustrated embodiment, the turbine exhaust duct 30 is a non-axisymmetric dual port exhaust duct configured for directing combustion gases laterally on opposed sides of the outer case assembly 18 of the gas turbine engine 10. The turbine exhaust duct 30 is qualified as "non-axisymmetric" because the two exhaust ports thereof are not coaxial to the central axis 17 of the gas turbine engine (i.e., the exhaust flow discharged from the exhaust duct is not axial, it is rather directed in a direction that diverges from the central axis 17). According to at least some embodiments, the TED 30 has a generally "Y-shaped"

body 31 including an inlet conduit 33 extending axially around the central axis 17 for receiving the annular flow of combustions gases discharged from the last stage of LP turbine 14A, and first and second outlet conduits 34, 35 branching off laterally from the inlet conduit 33. According to some embodiments, the first and second outlet conduits 34, 35 are identical.

As can be appreciated from FIG. 1, the downstream end of each outlet conduit 34, 35 projects outwardly of the exhaust case 18D. As best shown in FIG. 3, each outlet conduit 34, 35 terminates into an exhaust port. The outlet conduits 34, 35 extend along respective axes that intersect the central axis 17. According to the illustrated embodiment, these axes have a main radial component and a secondary (i.e., smaller) axial component relative to the central axis 17. Stated differently, the exhaust ports of the outlet conduits 34, 35 are oriented to direct the combustion gases mainly in a radially outward direction. According to some embodiments, the exhaust port opening of the outlet conduits 34, 35 are circular. However, it is understood that other geometries are contemplated as well (e.g., oval).

Figure 5:
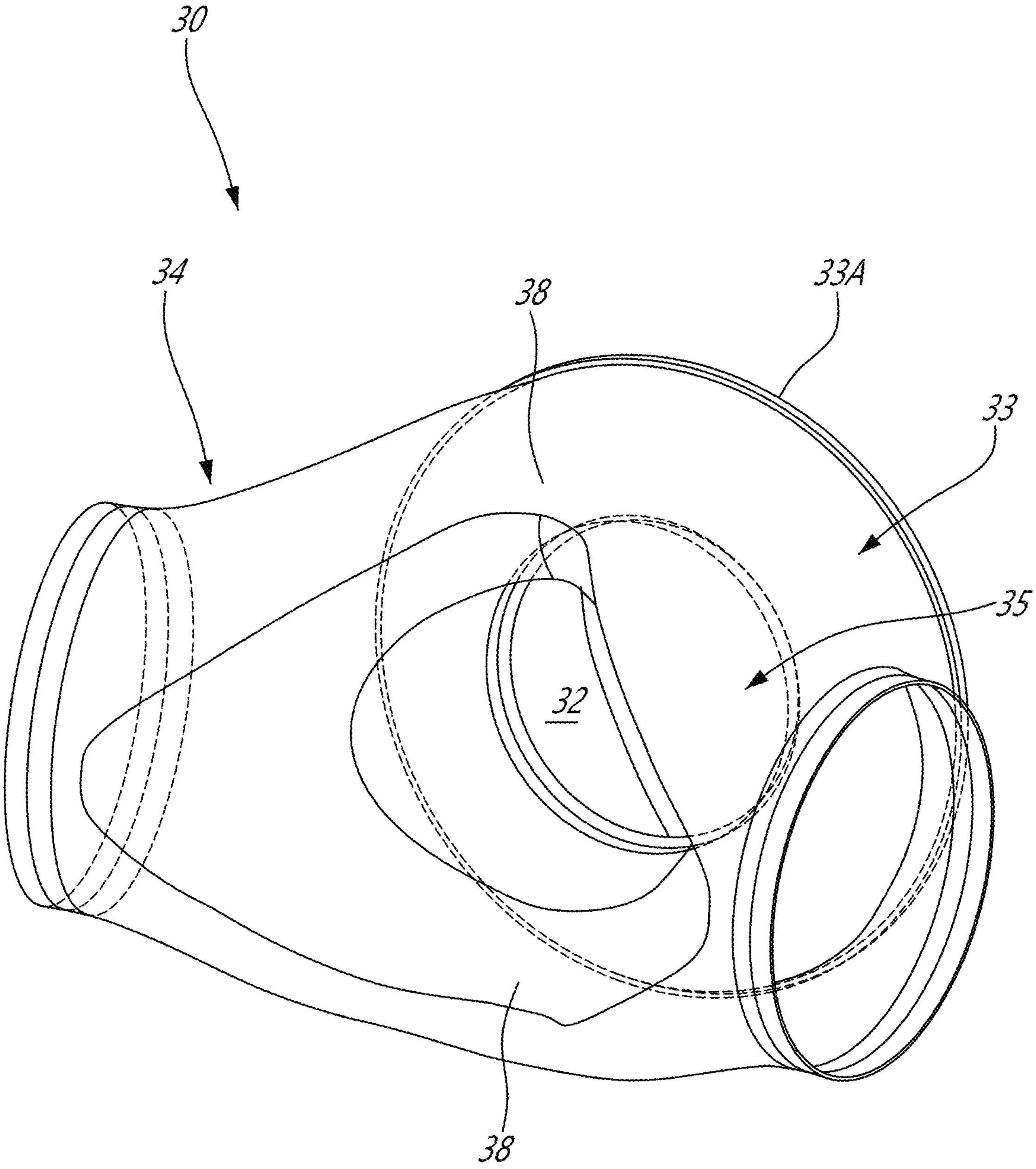
FIG. 5 is another three dimensional view of the turbine exhaust duct of FIG. 4.

Referring to FIGS. 3-5, the Y-shaped body 31 of the turbine exhaust duct 30 defines a fluid flow passage(s) about a central bore 32 for accommodating a shaft engine. The fluid flow passage of the annular body 31 generally includes the inlet conduit 33 through which the bore 32 extends, and in this example the two outlet conduits 34, 35 branching off from the inlet conduit 33 and extending radially away therefrom relative to the central axis 17. It is understood that the inlet and outlet conduits 33, 34, 35 may adopt various configurations. For instance, they can take the form of cylindrically straight or curved conduits. If desired, the body 31 may include more than two outlet conduits. The outlet conduits 34, 35 may not be perpendicularly positioned relative to the inlet conduit 33 (i.e., be purely radially oriented with respect thereto), but rather may extend both radially and axially with respect thereto. Therefore, the body 31 could adopt various configurations including T-shaped and Y-shaped configurations. It is understood that any suitable configurations for the inlet and exhaust conduits may be used.

The inlet conduit 33 includes an inlet end 33A located adjacent the turbine section 14 for receiving combustion gases therefrom. The outlet conduits 34, 35 are generally cylindrical in shape in this example (though any suitable shape may be employed) and have respective outlet centerlines which extend at an angle relative to each other. As shown in FIGS. 3 and 4, the outlet conduits 34, 35 have corresponding inlet ends 34A, 35A (FIG. 3) and outlet ends 34B, 35B. The inlet ends 34A, 35A are defined at the intersection between the inlet conduit 33 and the outlet conduits 34, 35, as shown schematically by the dotted lines in FIG. 3.

Referring to FIGS. 4-5, the inlet conduit 33 is annular about the central axis 17, which also defines the central axis of the inlet conduit 33. The inlet conduit 33 is defined by an inner peripheral wall 36 and an outer peripheral wall 37. The outer peripheral wall 37 is a circumscribing wall of the inlet conduit 33, and constitutes a periphery of the inlet conduit 33. The inlet conduit 33 may include two circumferentially spaced-apart splitters 38. The splitters 38 may take the form of raises or bumps formed inside the body 31 at a bottom of the inlet conduit 33 and project in a direction toward the central axis 17. The splitters 38 are configured to split the inlet flow in two to direct the two flows towards the outlet conduits 34, 35. The splitters 38 may be omitted in some configurations.

As shown in FIGS. 4-5, the outer peripheral wall 37 and the inner peripheral wall 36 are connected to one another at the outlet ends 34B, 35B of the outlet conduits 34, 35. It may therefore be said that the outlet conduits 34, 35 are defined conjointly by the inner peripheral wall 36 and the outer peripheral wall 37. In other words, the inner peripheral wall 36 and the outer peripheral wall 37 are cylindrically shaped at the inlet end 33A of the inlet conduit 33 and their shape diverge from the central axis 17 and merge together to conjointly define the outlet ends 34B, 35B of the outlet conduits 34, 35.

Referring to FIGS. 2-3, the exhaust system 15 further includes exhaust ports 45 secured to the exhaust case 18D and being in register with the openings 18E, which are located between forward and rearward ends 18F, 18G of the exhaust case 18D relative to the direction of travel D. The exhaust ports 45 protrude away from the exhaust case 18D in a direction having a radial component relative to the central axis 17. The exhaust ports 45 each extend circumferentially around port axes A1 that are transverse to the central axis 17. As illustrated, the exhaust ports 45 are secured to the exhaust case 18D via fairings 46 that bridge gaps defined between peripheries of the openings 18E and the exhaust ports 45.

As illustrated in FIG. 3, the gas turbine engine 10 includes a bearing housing 49. The bearing housing 49 extends around the shaft 22. The exhaust case 18D supports the bearing housing 49. The bearing housing 49 extends from a forward end to a rear end, the rear end located closer to the turbine section 14 than the forward end. The bearing housing 49 is a static structure that is interconnected to the exhaust case 18D via suitable supports. The purpose of the bearing housing 49 is to define a bearing cavity in which bearings are contained. The bearings rolling support the shaft during rotation. A lubricating system may be configured to inject oil in the bearing cavity to maintain the bearings suitably lubricated during use. The bearing housing 49 may be less exposed to the hot combustion gases than the turbine exhaust duct 30. Consequently, it is expected that thermal growth of the turbine exhaust duct 30 will be greater than that of the bearing housing 49.

It has been observed by inventors of the present disclosure that, at engine start up, the flow of hot combustion gases through the turbine exhaust duct 30 may generate thermal-induced displacement where the turbine exhaust duct 30 is typically secured to surrounding structure, namely to the exhaust case 18D. These thermal displacement may impair structural integrity and performance of the turbine exhaust duct 30. There is thus a desire to mitigate thermal fights between the turbine exhaust case 18D and the TED 30, and allow thermal growth of the turbine exhaust duct 30. Moreover, inventors of the present disclosure discovered that under certain conditions, notably at engine start up, the circulation of hot gases passing through the turbine exhaust duct 30 may generate thermal displacement at the attachment between the turbine exhaust duct 30 and surrounding structural component, such as the bearing housing 49 or the exhaust case 18D. Inventors found that thermal fights may be mitigated by dissociating the connection to the structural part (e.g., the exhaust case 18D) and modify the connection to allow thermal displacement. The disclosed connection of the TED 30 is now fixed at the inlet end 33A of the inlet conduit 33 where the temperature is more uniform and in an area where the geometry is symmetrical. It may allow the gas path surface (e.g., the inner wall 36) to move axially and radially while minimizing thermal stress. It may also allow the TED 30 to deform in response to pressure variations from the engine trust. This design may now be substantially dissociated from the engine structure.

In the embodiment shown, the exhaust system 15 includes a fixture 50 secured (integrally or not) to the inner wall 36. The fixture 50 is detachably securable to the bearing housing 49. In such a configuration, the turbine exhaust duct 30 is cantilevered off the fixture 50. The fixture 50 may be part of a hairpin connection used to provide flexibility to the assembly of the turbine exhaust duct 30 in the exhaust system 15. In some embodiments, the fixture 50 and the turbine exhaust duct 30 may be parts of a single monolithic body. For example, the fixture 50 and the turbine exhaust duct 30 may be casted or machined as a single part. Alternatively, in some embodiments, the fixture 50 may be welded, brazed, or secured via any other suitable means to the turbine exhaust duct 30.

The fixture 50 has a shape configured to impart a radial degree of freedom to the turbine exhaust duct 30 relative to the exhaust case 18D. The fixture 50 is flexible in a radial direction relative to the central axis 17. To this end, and in some embodiments, the fixture 50 includes a first section protruding from the inner wall 36 towards the central axis 17 in a direction being mainly radial relative to the central axis 17 and a second section extending transversely to the first section in a direction being mainly axial relative to the central axis 17. The fixture 50 may be secured to the bearing housing 49 via the second section. According to the illustrated embodiment, the first section protrudes from the inner wall 36 at a location being axially offset downstream from the inlet end 33A of the inlet conduit 33. This may result in a distal end of the second section being substantially axially aligned with the inlet end 33A of the inlet conduit 33. However, this need not be the case.

In the context of the present disclosure, the expression "mainly" as in "mainly axial" implies that a direction along which a component extends is oriented such that its primary vector component lies along an axial direction relative to the central axis 17. While the direction may include secondary components (e.g., radial direction), an axial component is predominant—i.e., it is greater in magnitude than the secondary components. In the context of the present disclosure, the expression "substantially" implies slight deviations caused by, for instance, manufacturing tolerances.

Via the hairpin connection, which includes the fixture 50, the turbine exhaust duct 30 is radially movable relative to the exhaust case 18D via flexion of the second section of the fixture 50. More specifically, an axial length and/or a wall thickness of the second section is selected such that the turbine exhaust duct 30 may move radially relative to the bearing housing 49 or exhaust case 18D with thermal growth of the turbine exhaust duct 30. This radial movement may be provided by one or more of a hinging of the second section relative to the first section of the fixture 50, via a bending of the second section of the fixture 50 along its axial length, and a hinging of an intersection between the fixture 50 and the inner wall 36 of the turbine exhaust duct 30.

To secure the fixture 50 to the bearing housing 49, the fixture 50 further includes an annular flange extending transversally to the second section. The annular flange extends mainly radially and towards the central axis 17. As depicted in FIG. 3, the bearing housing 49 includes a mating flange that is in register with the annular flange of the fixture 50. These two flanges may be detachably secured to one another via bolts. However, other securing means such as a threading engagement, dog and slot, keyway and so on are contemplated without departing from the scope of the present disclosure.

To further mitigate stress-induced thermal growth, the outer wall 37 of the turbine exhaust duct 30 may be devoid of connection to the exhaust case 18D. Thus, the turbine exhaust duct 30 may be secured solely to the bearing housing 49 via the fixture 50 and may be devoid of any other attachment to surrounding structure, including the turbine exhaust case 18D. This may ensure that thermal growth of the turbine exhaust duct 30 is not transmitting any stress to that surrounding structure. To further contribute to this effect, gaps G (FIG. 3) may extend annularly fully around the outlet ends 34B, 35B of the outlet conduits 34, 35. This may allow the turbine exhaust duct 30 to thermally expand while avoiding interaction with the exhaust case 18D.

As shown in FIG. 3, the exhaust ports 45, which are secured to the exhaust case 18D, have converging sections extending downstream of the outlet ends 34B, 35B of the outlet conduits 34, 35 relative to a flow of the combustion gases. The converging sections having a cross-sectional areas that decrease along a direction of the flow of the combustion gases. The cross-sectional areas are taken on planes being normal to the port axes A1 of the exhaust ports 45. This may ensure that the exhaust ports 45 are radially aligned with the outlet conduits 34, 35 relative to the port axes A1, but axially offset from one another. This may minimize pressure drop while avoiding the combustion gases to flow through the gaps G located therebetween. In other words, this radial alignment renders the outlet conduits substantially flush with outlets of the exhaust ports 45. Moreover, the axial offset, relative to the port axes A1, between the outlet ends 34B, 35B of the outlet conduits 34, 35 and the exhaust ports 45 may permit a growth of the outlet conduits 34, 35 due to thermal expansion without contacting the exhaust ports 45.

Furthermore, having the turbine exhaust duct 30 structurally independent of the exhaust case 18D created challenges to assemble these two components together since the turbine exhaust duct 30 is received inside the exhaust case 18D.

Figure 6:
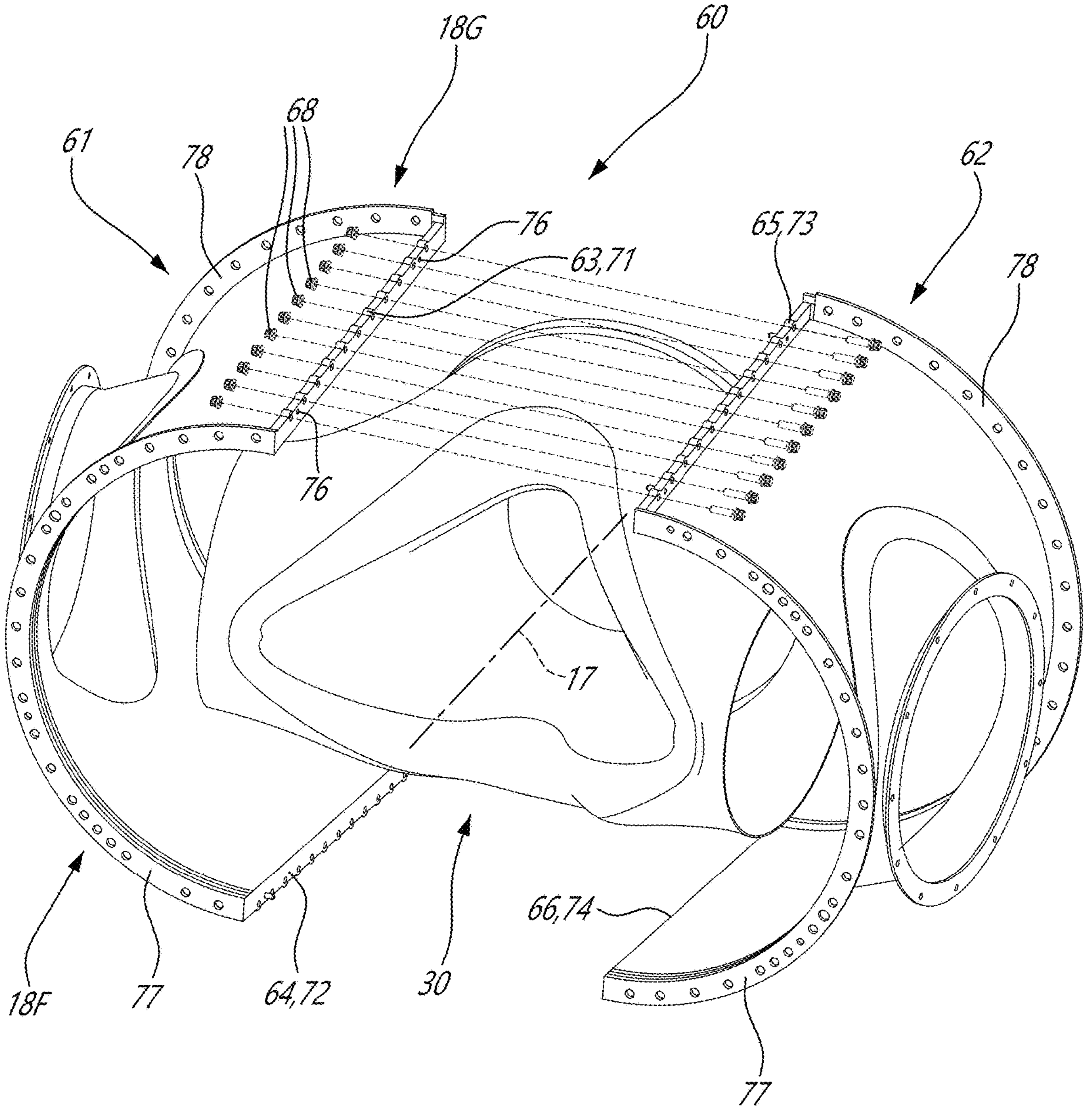
FIG. 6 is a three-dimensional exploded view of the exhaust system of FIG. 2.

Referring to FIG. 6, to at least partially alleviate the aforementioned drawbacks, the exhaust case, which is referred to with reference numeral 60, and which encloses the turbine exhaust duct 30, includes two sections, namely a first section 61 and a second section 62. The first section 61 and the second section 62 may be symmetrical images of one another such that each extend half of a full circumference around the central axis 17. However, this need not be the case and one section may extend a greater circumferential length than the other. In some embodiments, each of the first and second sections 61, 62 defines a respective one of the openings 18E defined therethrough. Again, this need not be the case and, in some cases, each of the openings 18E may be defined conjointly by the two sections 61, 62 in an alternative embodiment.

The first section 61 extends axially between the forward and rearward ends 18F, 18G and around the central axis 17 from a first edge 63 to a second edge 64. A first flange 71 is provided at the first edge 63 and a second flange 72 is provided at the second edge 64. Similarly, the second section 62 extends axially between the forward and rearward ends 18F, 18G and around the central axis 17 from a third edge 65 to a fourth edge 66. A third flange 73 is provided at the third edge 65 and a fourth flange 74 is provided at the fourth edge 66. In some embodiments, the first flange 71 meets the third flange 73 and the second flange 72 meets the fourth flange 74 on a plane containing the central axis 17.

Figure 7:
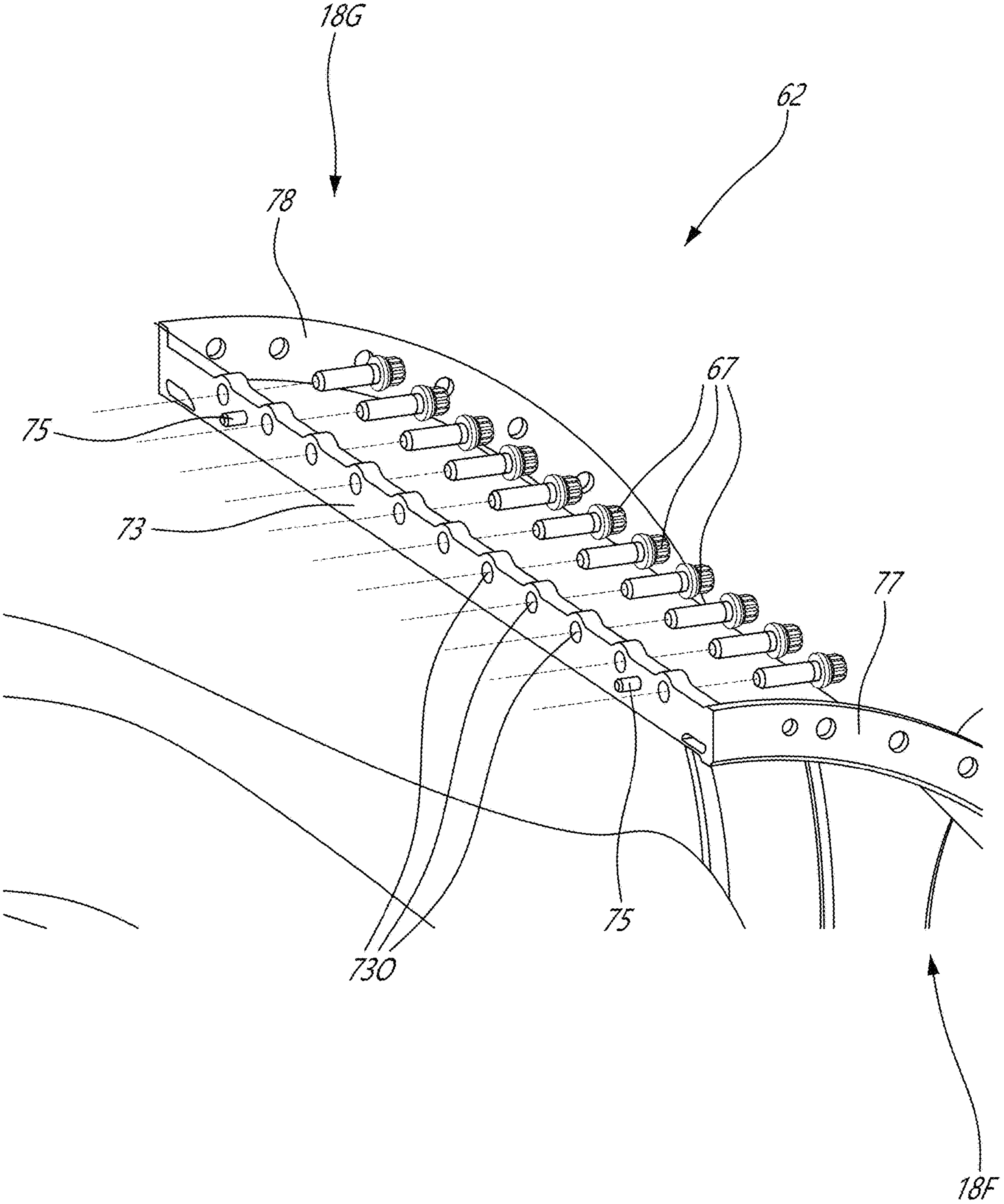
FIG. 7 is an enlarged view of a portion of FIG. 6.

Hence, the first section 61 is detachably secured to the second section 62 via the first flange 71 being detachably secured to the third flange 73 and via the second flange 72 being detachably secured to the fourth flange 74. In this embodiment, and as shown in FIG. 7, the flanges define each apertures, referred to with reference numeral 730 for the third flange 73. The apertures of the mating flanges are in register with each other to receive correspondingly-sized bolts 67. Nuts 68 are threadingly engaged to the bolts 67 to lock the mating flanges against one another. Other fastening means may be used such as clamps, dog and slots, bayonet connection, keyway, and so on.

Such a split case configuration may allow to have the two sections 61, 62 of the exhaust case 60 a greater thickness than the other cases of the case assembly 18. For instance, the other cases may be made of sheet metal having a thickness of about 0.05 to 0.1 inch. The disclosed exhaust case 60 may have a thickness of about 0.25 inch. This substantially greater thickness may contribute in increasing a stiffness of the exhaust case 60.

As shown more specifically in FIG. 7, each pair of mating flanges may include one or more, two in this embodiment, locating pins 75. For instance, FIG. 7 illustrates the second section 62 and the third flange 73, which includes two locating pins 75 disposed adjacent respective opposite axial ends of the second section 62. Each of these pins is sized to be slidably received into a corresponding one of two locating apertures 76 (FIG. 6) defined by the first flange 71 (FIG. 6). Also, the pins are received into locating apertures defined by the third flange 73. In other words, for each locating pin, two registering apertures are bored each on a respective one of each pair of the mating flanges and the pin is received into these registering apertures. Only one or more than two apertures may be used. The same configuration of locating pins and apertures may be provided at the second and fourth flanges 72, 74. These locating features may facilitate the assembly of the exhaust case 60. Indeed, these pins and apertures may hold the first section 61 relative to the second section 62 while the bolts and nuts are being fastened at the mating flanges. These pins and apertures may be omitted in some embodiments.

Each of the first and second sections 61, 62 define a forward mounting flange 77 at the forward end 18F and a rearward mounting flange 78 at the rearward end 18G. Once assembled together, the forward mounting flange 77 and the rearward mounting flange 78 conjointly extend fully around the central axis 17. These flanges 77, 78 are used to secure the exhaust case 60 to the turbine case 18C at the rearward end and to the RGB at the forward end 18F.

Referring now to FIGS. 8A to 8F, a sequence of steps for manufacturing the exhaust case 60 is being illustrated and described below. It will be appreciated that the order in which the steps described below are performed may vary in some embodiments.

Figure 8A:
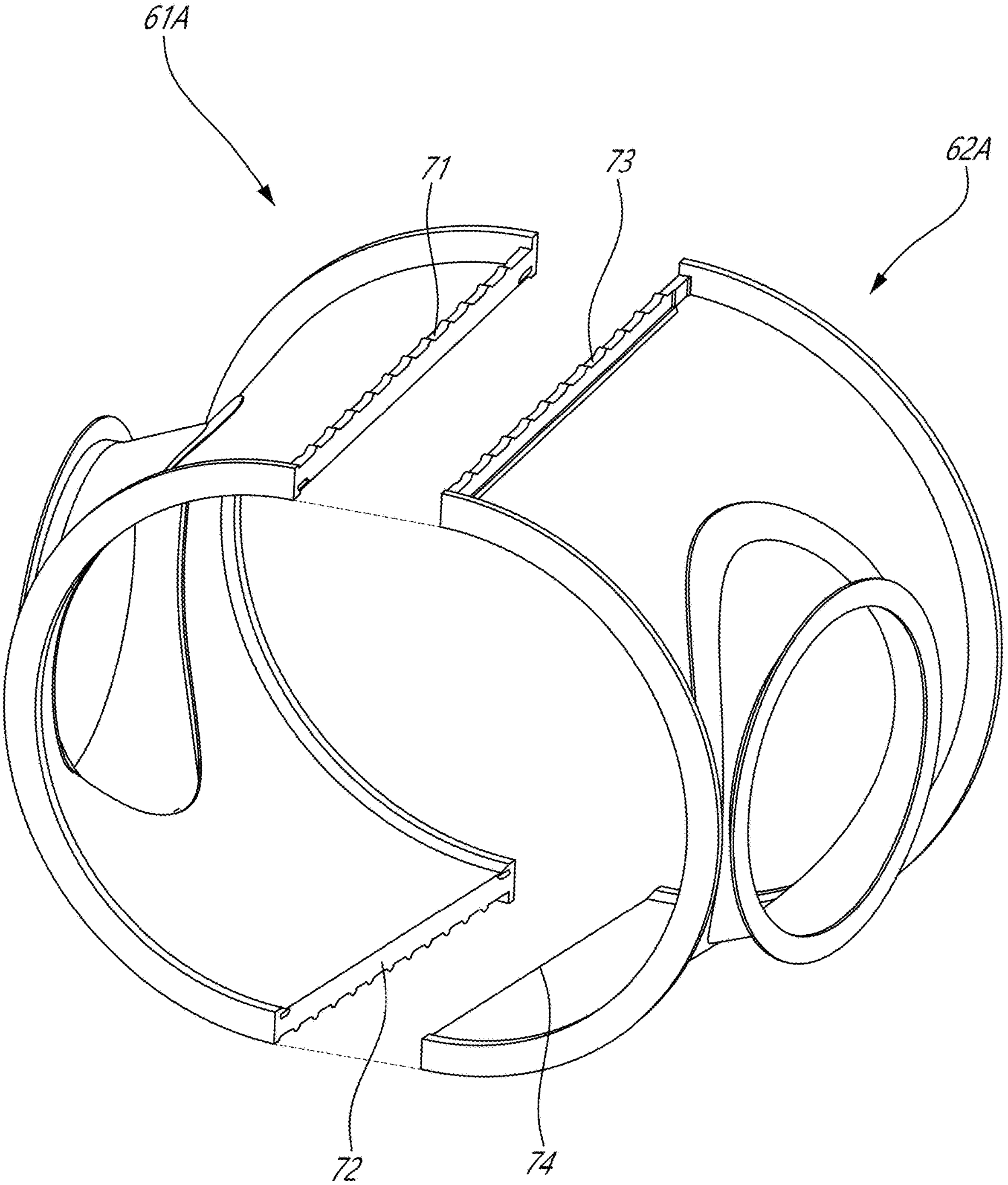
FIGS. 8A to 8F are three-dimensional views of the exhaust system of FIG. 2 illustrating a manufacturing process thereof.

In FIG. 8A, a raw first section 61A and a raw second section 62A are shown and being obtained via any suitable manufacturing process. For instance, these raw sections may be obtained by casting, additive manufacturing, or created via a welded assembly. In the later case, this includes obtaining two arcuate sheets to which are welded the different flanges. In the former case, the process may yield the two raw sections including all of the required flanges. These raw sections require further machining to be used in the gas turbine engine 10. The two raw sections define first, second, third, and fourth raw flanges 71A, 72A, 73A, 74A.

Figure 8B:
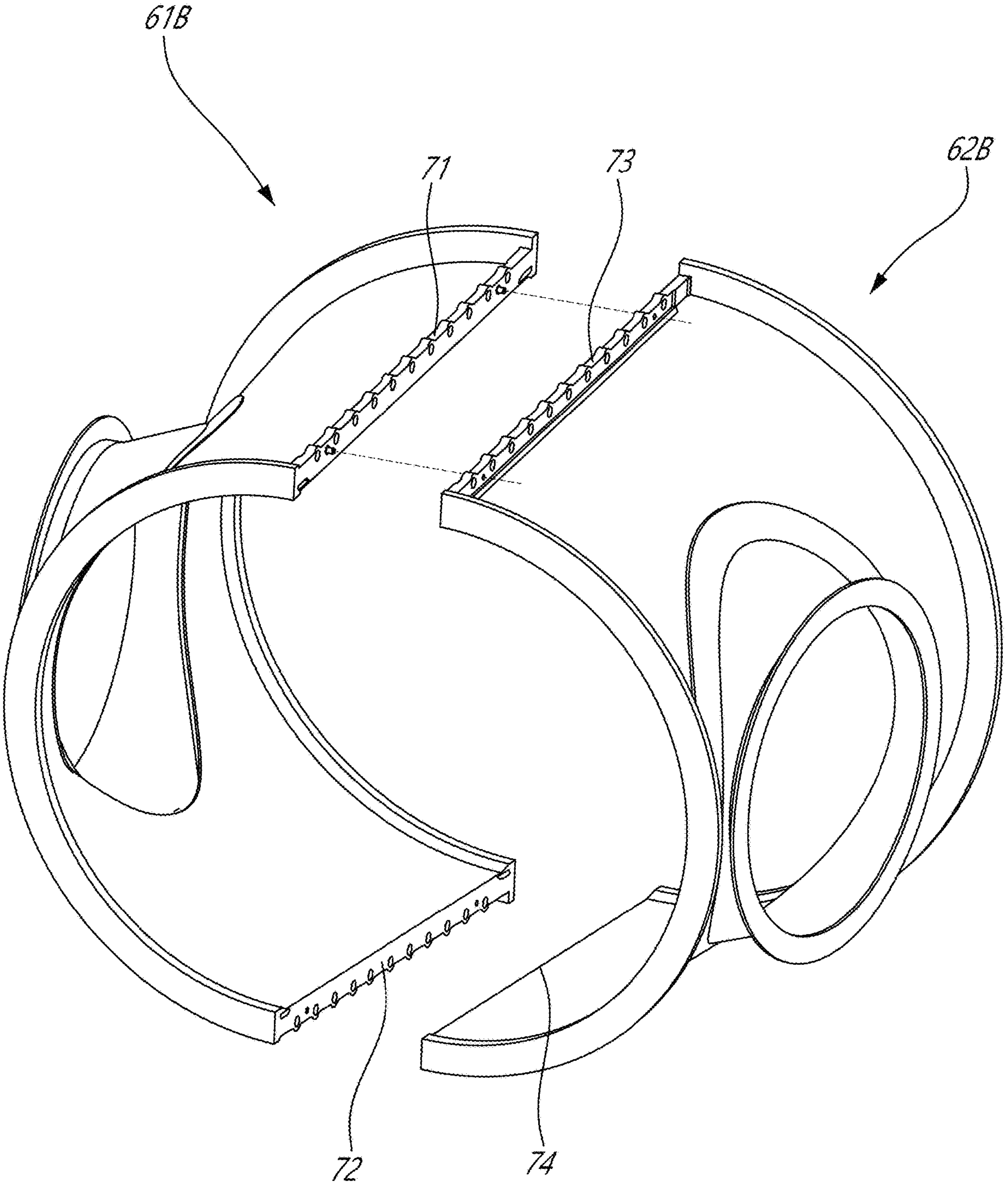

Then, the first, second, third, and fourth raw flanges 71A, 72A, 73A, 74A are being machined to obtain the actual first, second, third, and fourth flanges 71, 72, 73, 74. The case with the flanges machined is shown in FIG. 8B. The machining step here includes ensuring that the mating flanges mate each other suitably such that there is no gap between them and to ensure that the exhaust case 60 is concentric with the central axis 17 once the two sections are assembled. The machining also includes boring the apertures 730 (FIG. 7) used for securing the mating flanges together using the bolts and nuts. Also, the locating apertures 76 (FIG. 6) may be bored on each flanges and the locating pins 75 may be inserted therein. After this machining step, a first intermediate section 61B and a second intermediate section 62B are obtained.

Figure 8C:
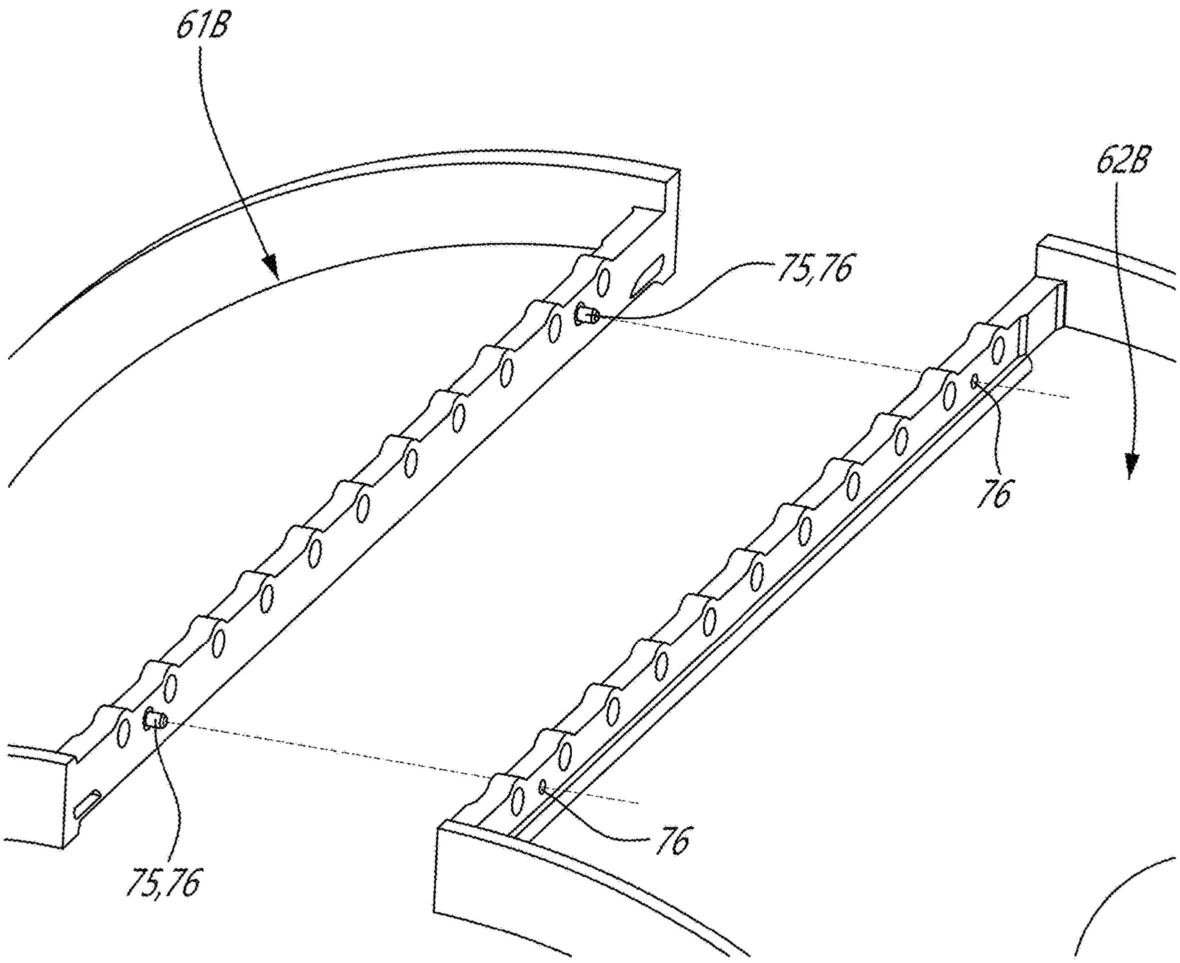
Figure 8D:
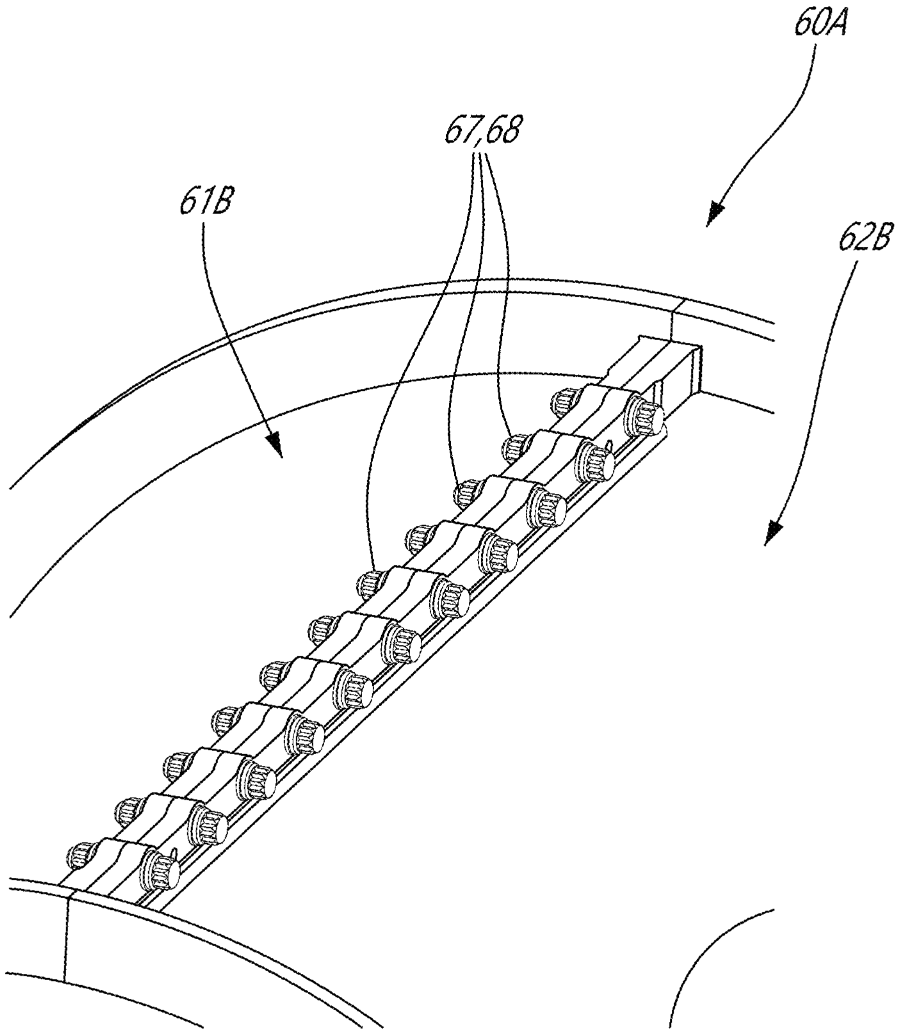

Then, as shown in FIG. 8C, the locating pins 75 are inserted into the respective locating holes 76. And, as depicted in FIG. 8D, the two intermediate sections 61B, 62B may be assembled to one another using the locating pins 75 and locating apertures 76 and the nuts 68 and bolts 67.

Figure 8E:
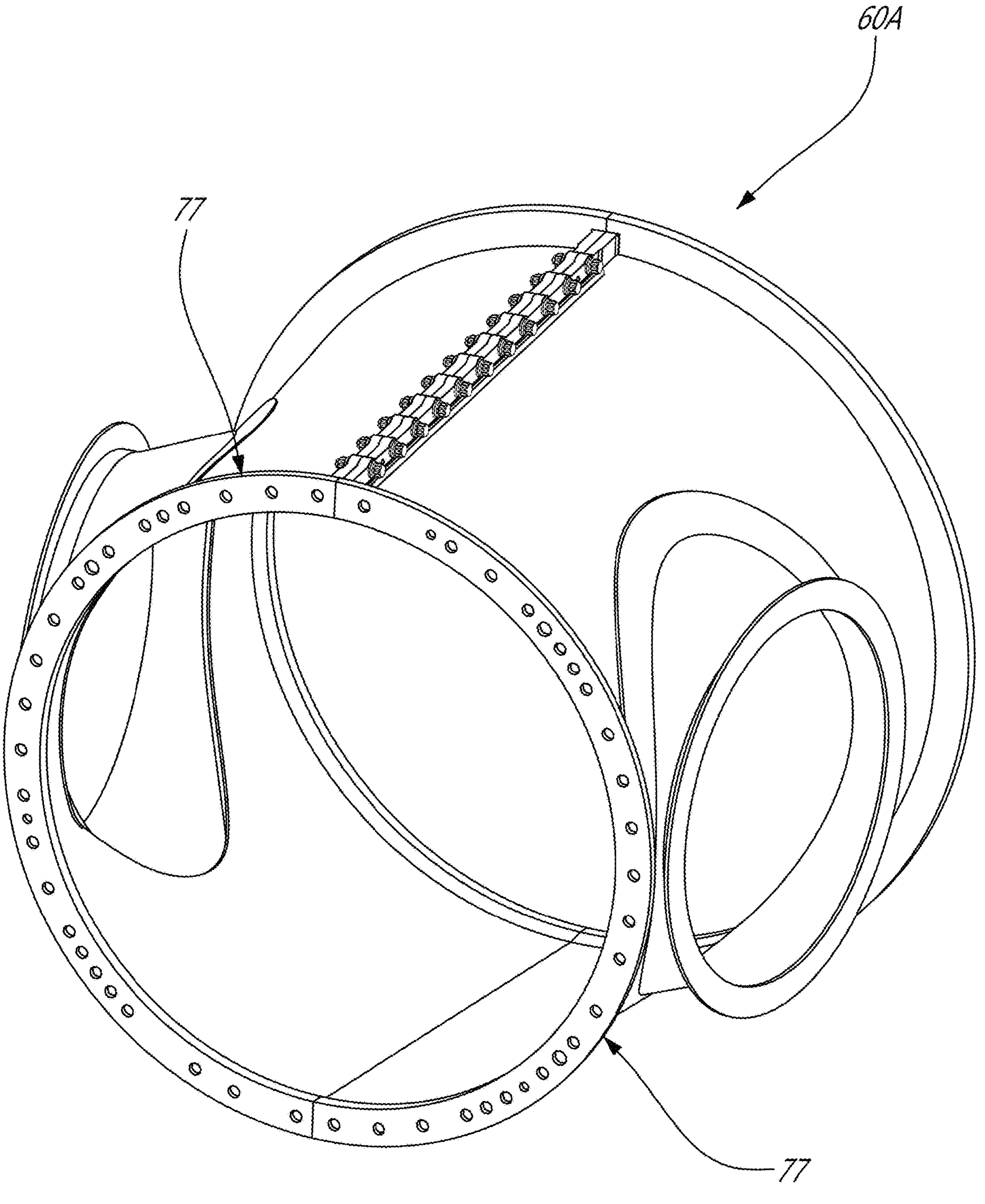
Figure 8F:
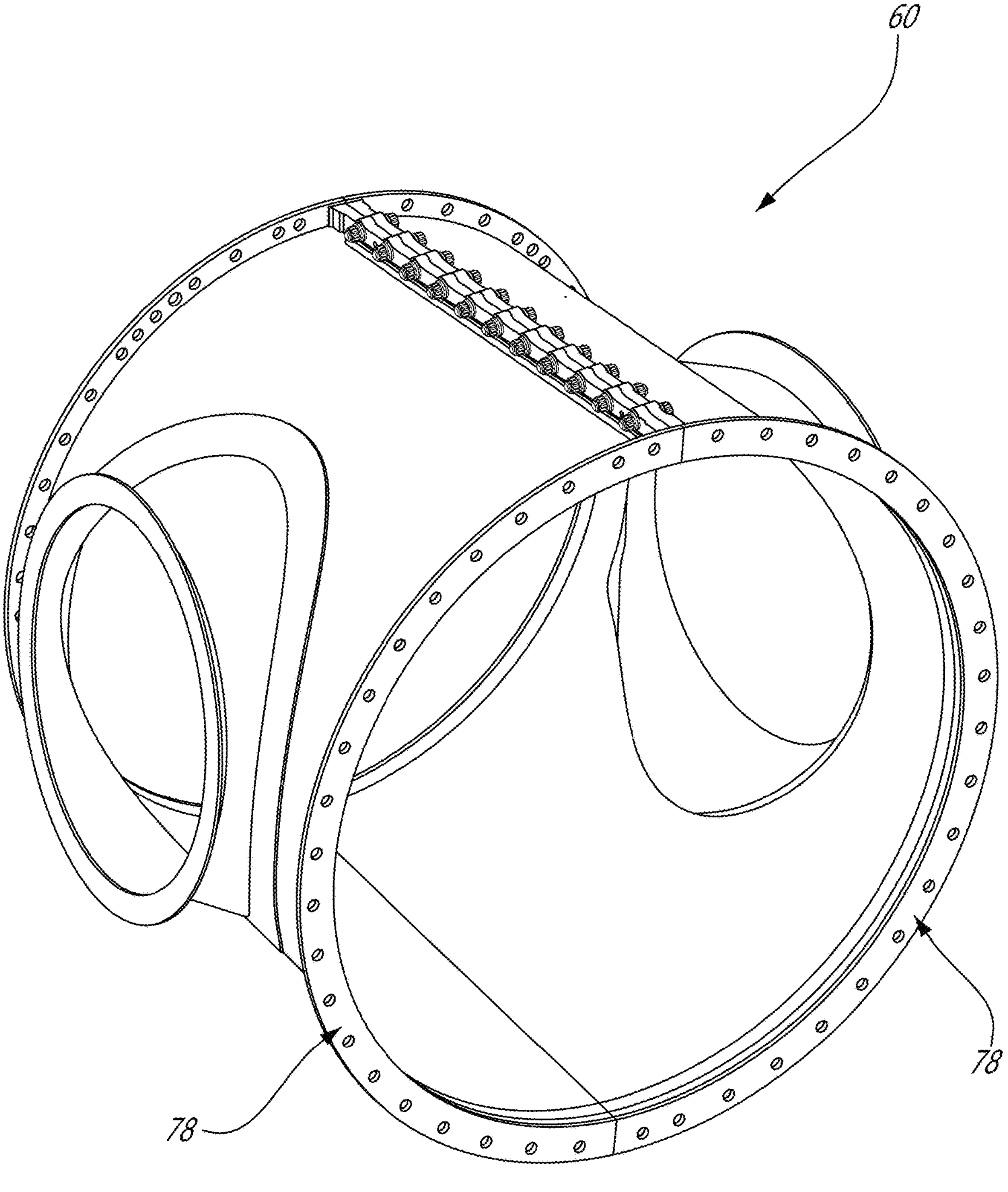

Then, as shown in FIG. 8E, an intermediate exhaust case 60A is obtained, but is not yet ready to be installed since the forward mounting flanges 77 and the rearward mounting flanges 79 are still in their raw shape. FIG. 8E illustrates a step in which the forward mounting flanges 77 of each of the two intermediate sections 61B, 62B are machined from their respective raw shapes. Then, as shown in FIG. 8F, the rearward mounting flanges 78 of each of the two intermediate sections 61B, 62B is machined from their respective raw shapes to yield the exhaust case 60.

Once machined, the two sections may be disassembled to insert the turbine exhaust duct 30 therein. Then, the two sections are secured to each other as described above.

The disclosed exhaust case 60 may enhance stiffness of the gas turbine engine 10. This may allow to minimize challenges created by thermal growth of the turbine exhaust case 30 and of vibrations of said case. Moreover, the exhaust case 60, by being split in two halves, may facilitate the assembly of the turbine exhaust duct 30 therein. Indeed, once the exhaust case 60 is machined as shown, it may be disassembled such that each halves is positioned to align the exit ports or openings with the outlet conduits of the turbine exhaust duct 30. Then, the exhaust case 60 may be re-assembled using the bolted connections at the mating flanges.

In the context of the present disclosure, the expression “about” implies a variation of plus or minus 10%.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term “connected” or “coupled to” may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An exhaust system for an aircraft engine, comprising:

a turbine exhaust duct (TED) having an inner wall and an outer wall conjointly defining an annular inlet conduit for directing combustion gases in an axial direction and extending around a central axis and outlet conduits fluidly communicating with the annular inlet conduit and extending generally radially outwardly relative to the inlet conduit; and an exhaust case enclosing the TED and extending around the central axis, the exhaust case defining exit ports fluidly communicating with the outlet conduits of the TED, the outlet conduits of the TED being devoid of connection to the exhaust case, annular gaps extending around outlet ends of the outlet conduits to allow movement of the TED relative to the exhaust case, the exhaust case extending from a forward end to a rearward end and having:

a first section extending between the forward end and the rearward end, the first section extending around the central axis from a first edge to a second edge, the first section having a first flange at the first edge and a second flange at the second edge; and a second section extending between the forward end and the rearward end, the second section extending around the central axis from a third edge to a fourth edge, the second section having a third flange at the third edge and a fourth flange at the fourth edge, wherein the first section is detachably secured to the second section via the first flange being detachably secured to the third flange and the second flange being detachably secured to the fourth flange.

2. The exhaust system of claim 1, wherein the first flange is securable to the third flange and the second flange is securable to the fourth flange via bolts and nuts.

3. The exhaust system of claim 1, wherein each of the first section and the second section defines a respective one of the exit ports.

4. The exhaust system of claim 1, wherein the first flange contacts the third flange, and the second flange contacts the fourth flange, at a plane containing the central axis.

5. The exhaust system of claim 1, comprising a locating pin mounted to the first flange and a locating aperture defined by the third flange, the locating pin slidably received in the locating aperture upon the first flange contacting the third flange.

6. The exhaust system of claim 1, comprising a fixture secured to the inner wall of the TED, the fixture securable to a structural component of the aircraft engine, the TED being cantilevered off the fixture, the fixture being flexible in a radial direction relative to the central axis.

7. The exhaust system of claim 1, wherein the outer wall of the TED is devoid of connection to the exhaust case.

8. The exhaust system of claim 1, wherein the first section and the second section are symmetrical.

9. The exhaust system of claim 1, wherein a thickness of the first section and the second section is about 0.25 inch.

10. A reverse-flow gas turbine engine of an aircraft, comprising:

an outer case assembly extending around a central axis and enclosing a core, the core including a compressor section, and a turbine section, the turbine section located forward of the compressor section relative to a direction of travel of the aircraft, the outer case assembly including an exhaust case defining exit ports; and a turbine exhaust duct (TED) having an inner wall and an outer wall conjointly defining an annular inlet conduit for directing combustion gases in an axial direction and extending around the central axis and outlet conduits fluidly communicating with the inlet conduit and extending generally radially outwardly relative to the annular inlet conduit, the outlet conduits communicating with the exit ports, the outlet conduits of the TED being devoid of connection to the exhaust case, annular gaps extending around outlet ends of the outlet conduits to allow movements of the TED relative to the exhaust case, wherein the exhaust case includes first and second sections extending axially relative to the central axis, the first and second sections conjointly extending fully around the central axis and detachably jointed together via mating flanges secured to opposed edges.

11. The reverse-flow gas turbine engine of claim 10, wherein the mating flanges include a first flange of the first section securable to a third flange of the second section and a second flange of the first section securable to a fourth flange of the second section via bolts.

12. The reverse-flow gas turbine engine of claim 11, wherein the first flange contacts the third flange, and the second flange contacts the fourth flange, at a plane containing the central axis.

13. The reverse-flow gas turbine engine of claim 11, comprising a locating pin mounted to the first flange and a locating aperture defined by the third flange, the locating pin slidably received in the locating aperture upon the first flange contacting the third flange.

14. The reverse-flow gas turbine engine of claim 10, wherein each of the first section and the second section defines a respective one of the exit ports.

15. The reverse-flow gas turbine engine of claim 10, comprising a fixture secured to the inner wall of the TED, the fixture securable to a structural component of the gas turbine engine, the TED being cantilevered off the fixture, the fixture being flexible in a radial direction relative to the central axis.

16. The reverse-flow gas turbine engine of claim 10, wherein the outer wall of the TED is devoid of connection to the exhaust case.

17. The reverse-flow gas turbine engine of claim 10, wherein the first section and the second section are symmetrical.

18. The reverse-flow gas turbine engine of claim 10, wherein a thickness of the first section and the second section is about 0.25 inch.

* * * * *